(No Model.)
W. R. COMINGS.
GLOVE FASTENER.
No. 353,845. Patented Dec. 7, 1886.
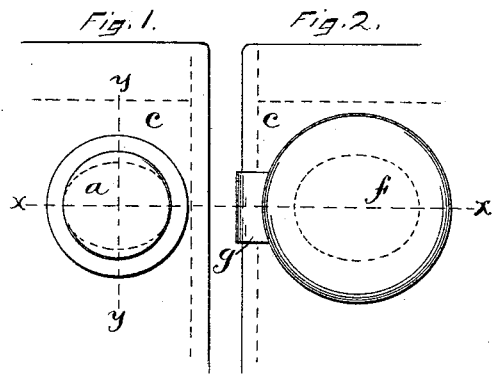
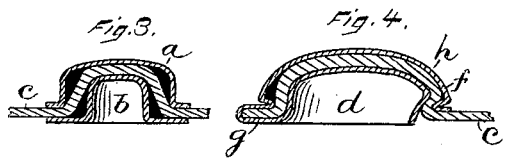
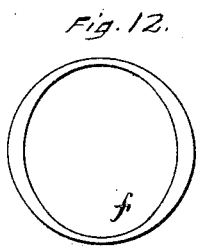
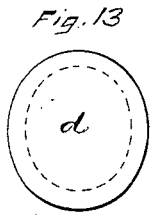
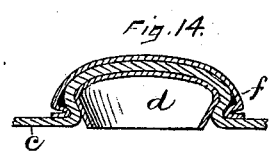
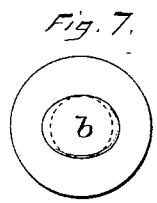
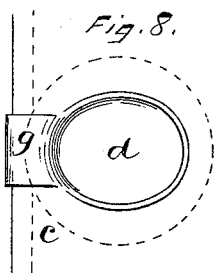
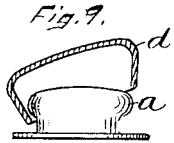
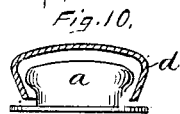
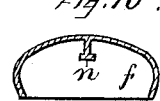
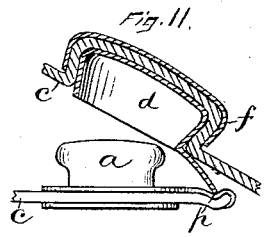
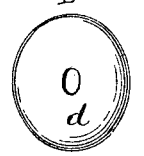
Witnesses.
John Edwards Jr.
Milton H. Bassett.
Inventor.
William R. Comings
By James Shepard
Atty.

UNITED STATES PATENT OFFICE.

WILLIAM R. COMINGS, OF LONDON, ENGLAND.

GLOVE-FASTENER.

SPECIFICATION forming part of Letters Patent No. 353,845, dated December 7, 1886.

Application filed June 12, 1886. Serial No. 205,023. (No model.)

*To all whom it may concern:*

Be it known that I, WILLIAM R. COMINGS, residing at 128a Queen Victoria Street, in the city of London, England, have invented certain new and useful Improvements in Fasteners for Gloves and other Articles, of which the following is a specification.

My invention relates to fasteners for gloves and other articles of the class having a socket member and stud member adapted to engage each other; and the objects of my invention are to improve the efficiency of the fasteners, to provide a better means for securing said fasteners to the fabric or other material, and to enable the fasteners to be made by automatic machinery.

In the accompanying drawings, Figures 1 and 2 represent, respectively, in plan view the stud member and socket member of my fastener as applied to a glove. Figs. 3 and 4 represent, respectively, sections of said members on the line $x\,x$ of Figs. 1 and 2. Fig. 5 represents a sectional view of the stud member on the line $y\,y$ of Fig. 1. Fig. 6 is a reverse plan or inside view of the stud detached from all other parts. Fig. 7 represents in plan view the stud-filling detached. Fig. 8 represents a reverse plan or inside view of the socket member as attached to the fabric. Fig. 9 represents, in section and elevation, the socket and stud, illustrating the manner of bringing the same into engagement. Fig. 10 is a like view of the same parts as engaged with each other. Fig. 11 represents the socket member in section and the stud member in elevation in a slightly-modified form. Fig. 12 is a reverse plan or inside view of the cap of the socket member as made of separate pieces. Fig. 13 is a plan view of the socket adapted to be secured within the cap, Fig. 12. Fig. 14 is a sectional view of the cap, Fig. 12, and socket, Fig. 13, as secured to the leather. Fig. 15 is a side elevation of the socket, Fig. 13. Fig. 16 is a sectional view of the cap of the socket member as provided with an additional locking device, and Fig. 17 is a plan view of the socket adapted for use with said cap, Fig. 16.

In the preferred form of my fastener the stud member consists of a hollow stud and stud-filling, while the socket member consists of the cap and socket, the latter serving as a filling for the cap, the fabric or leather in each case being clamped between the two parts of these respective members. The stud $a$ of the stud member is preferably made hollow. It is substantially in the form of a button, but of peculiar construction. It is substantially round and of uniform diameter at its head, but undercut on two sides, so as to have the appearance of a dovetailed or overhanging tenon when viewed in side view or section from one direction, (see Fig. 5,) and that of a straight-sided tenon when viewed in another direction, (see Fig. 3,) thereby forming under the round head or top an oval or elliptical neck, as indicated by the broken lines in Fig. 1. In so far as its functions as a stud or button are concerned, it may be made solid and secured to the fabric in any ordinary manner; but I prefer to form said stud of sheet metal, and hollow, in order to fasten it to the fabric or leather by means of the stud-filling $b$. In forming this stud of sheet metal with the oval neck under a round head, the hole in the base or flange of the stud will also have an oval form, as shown in Fig. 6. I make the stud-filling $b$ of an oval form, corresponding to the hole in the stud $a$, but smaller, and with undercut or dovetailed walls at the ends of the oval head, as shown in Fig. 5. The shape upon the other sides is immaterial. I prefer to form this stud of sheet metal; but it might be formed solid, if desired.

In order to secure the stud member to the leather, the stud $a$ is placed in the desired position thereon, when the stud-filling $b$ is placed over the hole on the inside of the stud, with the longest diameter of its head coinciding with the longest diameter of said hole. The two parts are then crowded together with the fabric between them, and the stud-filling is given a quarter-turn with reference to the stud, so as to force the dovetailed walls of the filling directly opposite the like walls of the stud, thereby firmly binding the parts together without puncturing the leather $c$, as shown in Fig. 5. The socket $d$ of the socket member I also prefer to construct of sheet metal. The socket therein is of an oval form, as shown in Fig. 8, and as indicated by broken lines in Fig. 17. Its diameter enlarges as the socket deepens, thereby forming overhanging or dovetailed side walls, especially as viewed in cross-section on a line through its smallest diameter, as shown in Figs. 9 and 10. The longest diameter at the mouth of the socket exceeds the diameter of the head of the stud *a*, while in the narrowest direction the mouth of the socket is less than the diameter of said head. It is therefore impossible to insert the stud within the socket by presenting the socket thereto squarely, or in a direct line. In order to engage the parts, the socket is given a rolling motion with reference to the stud, and one side is first passed under the undercut side of the stud and slipped down thereon, as illustrated in Fig. 9, after which the socket may be given a rolling motion to bring it into the position illustrated in Fig. 10, where the two parts are engaged securely against accidental displacement. The parts are disengaged in the same manner by rolling, as it were, one edge of the socket outward before attempting to disengage the other edge.

It is easy to learn the proper rolling or rocking motion to engage and disengage the two members of my fastener; but, if desired, an extension might be formed on the two members, so that they could be placed together, as shown in Fig. 11, and form a sort of a hinge or fulcrum, as at *p*, upon which the socket could rock or swing while the two parts were being engaged and disengaged. By making the stud member with straight sides at the ends of its oval neck the socket cannot catch at said ends, and will readily be disengaged by the rolling motion before described. In so far as the operation of this socket is concerned, it is immaterial by what manner it is secured to the leather; but it is admirably adapted for being secured thereto in the same manner, as hereinbefore described, for securing the stud member—that is, by clamping the leather firmly between a socket and a filling. In the socket member the socket itself serves as the filling, while the cap forms the socket into which the leather is pressed. In some instances I form the cap *f* and socket *d* in one piece of metal, connected by a narrow web, *g*, as shown in Figs. 2, 4, and 8. In this construction the cap is round and has its edges turned under, so as to form a socket which is contracted at the mouth. This web *g* is bent into a sort of an eye. In presenting the socket to the mouth of the cap the leather is placed in between the socket *d* and cap *f*, and the side *h* of the socket is made to first enter the cap, while the connecting-web is still in the form of an eye or rounded loop. This web is then flatted down, as shown in Fig. 4, whereby the side or edge *h* of the socket is pressed firmly up against the side of the cap *f*, and the parts are held firmly in position, as shown, the web of metal *g* assisting to hold the socket within the cap, and also forming a binding for a portion of the edge of the leather *c*, as shown.

If desired, the two parts of the stud member may be connected by a like web of metal and put together in the same manner.

When the socket and cap are not formed with the connecting-web of metal, they may be secured together in substantially the same way as first described for securing the two parts of the stud member together and to the fabric.

In Fig. 12 the inside or under edge of the cap is rolled inward in such manner as to leave an oval hole, as shown. The oval socket, Fig. 13, is forced into this cap, with the leather between said socket and cap, after which the socket or cap is given a quarter-turn to bind the parts together, as shown in Fig. 14.

The cap *f* and socket *d*, Figs. 16 and 17, are designed to be secured together by a quarter-turn, as before described, and, in addition to the overhanging sides of said parts, the cap is provided with an oval button, *n*, adapted to enter the oval hole in the back of the socket, Fig. 17, to serve as an additional fastening for holding the parts together. This will necessitate a small perforation through the leather, but does not materially change the mode of fastening the members to the leather.

I have described some of these modifications in the manner of fastening two parts of one member together and to the fabric as applied to the socket member only; but it is evident that the same manner of fastening may also be applied to the stud member, and for that purpose the hollow stud may be considered as the cap.

I am aware that a prior patent shows and describes a button consisting, essentially, of two parts—a hollow cap and a filling, the latter being forced within the cap, with the leather or fabric between them, for attaching the button to the material without puncturing it. Such a device for fastening buttons to garments is hereby disclaimed. Another prior patent shows and describes a button consisting of an eyelet member and a stud member, the stud member having an oval head and a round neck, the head being longer than the diameter of the hole through the eyelet member, so that the two could be engaged only by a rolling motion. Such a button is disclaimed.

I claim as my invention—

1. A fastener for gloves or other articles, consisting of a stud member, *a*, and a socket member, *d*, the stud member having a rounded head and a narrow elliptical neck, the socket member having the mouth of its socket in one direction smaller than the head of the stud member, so that the stud cannot enter said socket when presented squarely thereto, while the stud and socket may be engaged by presenting one edge of the socket to the neck of the stud member in advance of the edge at the opposite side, substantially as described.

2. The stud *a*, having an elliptical neck undercut or dovetailed on the longest sides of said neck, while said oval neck at the ends has substantially straight sides, in combination with the socket member, substantially as described, and for the purpose specified.

3. A fastener for gloves or other articles, consisting of a cap having an oval socket, and an internal part of oval form adapted to be placed within said cap, with the leather between them, and when so placed to be fastened by a quarter-turn axially of one of said two parts, substantially as described, and for the purpose specified.

4. The herein-described fastener for gloves or other articles, in which the cap and socket or stud and stud-filling are formed of a single piece connected by the web *g*, and adapted to be placed one within the other, substantially as described, and for the purpose specified.

WM. R. COMINGS.

Witnesses:
 JAMES SHEPARD,
 JOHN EDWARDS, Jr.